United States Patent
Weingärtner

(10) Patent No.: US 11,945,068 B2
(45) Date of Patent: Apr. 2, 2024

(54) MACHINING HEAD FOR THE MECHANICAL, IN PARTICULAR CUTTING, MACHINING OF A WORKPIECE

(71) Applicant: AFW HOLDING GMBH, Kirchham (AT)

(72) Inventor: Dominik Weingärtner, Pettenbach (AT)

(73) Assignee: AFW HOLDING GMBH, Kirchham (AT)

( * ) Notice: Subject to any disclaimer, the term of this patent is extended or adjusted under 35 U.S.C. 154(b) by 657 days.

(21) Appl. No.: 16/646,725

(22) PCT Filed: Sep. 4, 2018

(86) PCT No.: PCT/EP2018/073729
§ 371 (c)(1),
(2) Date: Jun. 26, 2020

(87) PCT Pub. No.: WO2019/052853
PCT Pub. Date: Mar. 21, 2019

(65) Prior Publication Data
US 2021/0031319 A1 Feb. 4, 2021

(30) Foreign Application Priority Data

Sep. 14, 2017 (EP) .................................... 17191215

(51) Int. Cl.
*B23Q 3/12* (2006.01)
*B23B 29/02* (2006.01)
(Continued)

(52) U.S. Cl.
CPC .............. *B23Q 3/12* (2013.01); *B23B 31/008* (2013.01); *B23Q 1/4814* (2013.01); *B23Q 1/4876* (2013.01); *B23B 29/02* (2013.01)

(58) Field of Classification Search
CPC ...... B23Q 1/4814; B23Q 1/4876; B23Q 3/12; B23B 29/02; B23B 31/008
See application file for complete search history.

(56) References Cited

U.S. PATENT DOCUMENTS 3,961,857 A * 6/1976 Koblesky .......... B23B 29/03457
279/6
4,023,451 A * 5/1977 Acton ............... B23B 29/03457
82/1.5
(Continued)

FOREIGN PATENT DOCUMENTS

CH 679289 1/1992
CN 105252325 A * 1/2016
(Continued)

OTHER PUBLICATIONS

Written Opinion in International Application No. PCT/EP2018/073729, dated Nov. 29, 2018.
(Continued)

*Primary Examiner* — Eric A. Gates
(74) *Attorney, Agent, or Firm* — Greenblum & Bernstein, P.L.C.

(57) ABSTRACT

A machining head for the mechanical, in particular cutting, machining, in particular for the actuation, of a workpiece, having: —a housing, —a housing-side coupling region for coupling a machining tool to be coupled to the machining head, wherein the housing-side coupling region comprises at least one coupling interface for directly coupling a machining tool to be coupled to the machining head.

18 Claims, 5 Drawing Sheets

Figure 1:
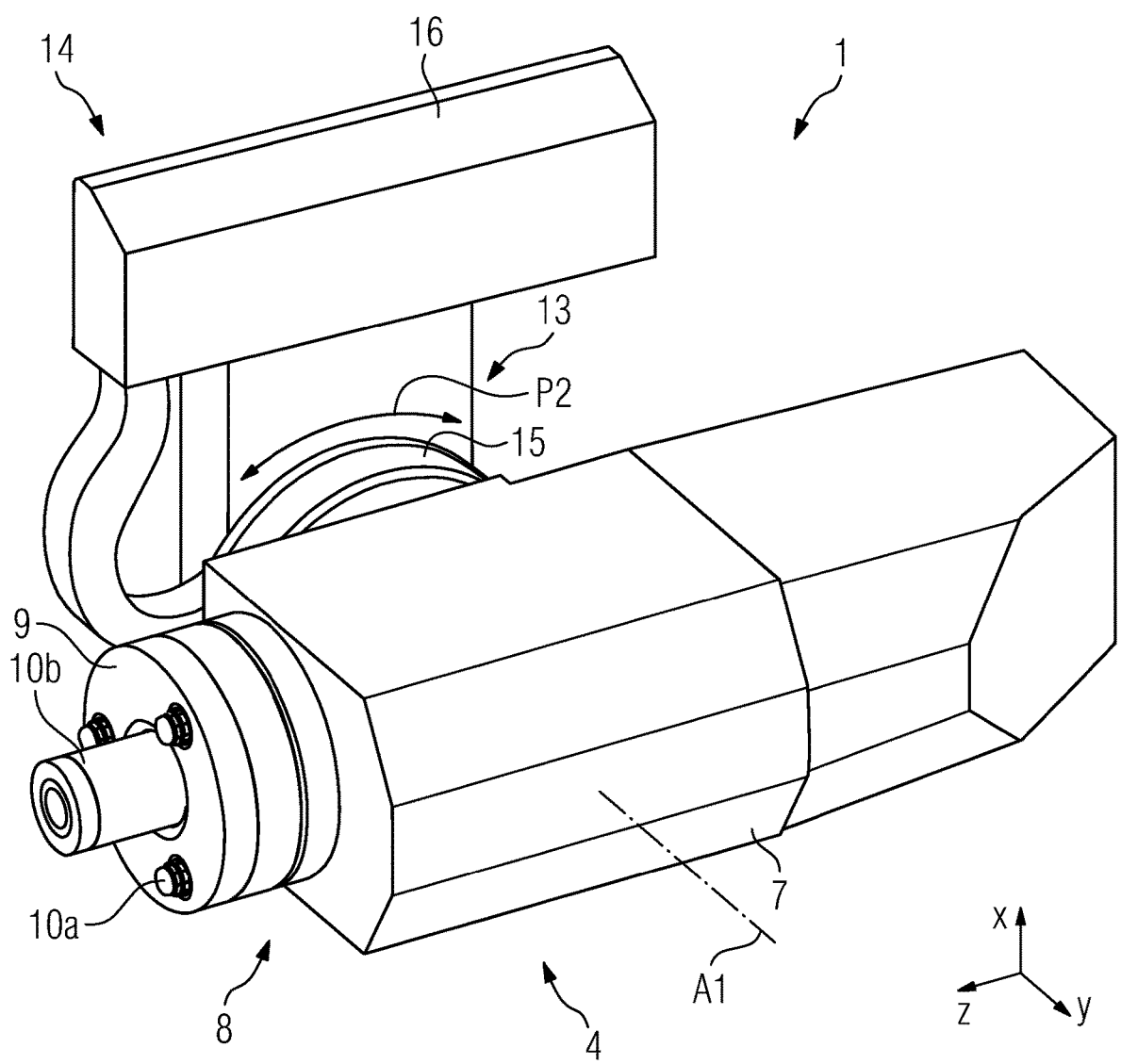

(51) Int. Cl.
    *B23B 31/00*    (2006.01)
    *B23Q 1/48*    (2006.01)

(56) References Cited

U.S. PATENT DOCUMENTS

| | | | |
|---|---|---|---|
| 4,043,695 A * | 8/1977 | Gottelt | B23B 29/03457 408/1 R |
| 4,569,115 A | 2/1986 | Unno et al. | |
| 5,823,722 A | 10/1998 | Takenaka | |
| 8,123,441 B2 * | 2/2012 | Pieri | B23B 29/03432 408/1 R |
| 2003/0069115 A1 | 4/2003 | Binder et al. | |
| 2005/0188798 A1 * | 9/2005 | Bischof | F16C 32/0489 82/1.11 |
| 2014/0228190 A1 | 8/2014 | Manso Marquez et al. | |
| 2014/0277685 A1 * | 9/2014 | Chen | B23B 41/04 700/160 |
| 2015/0266148 A1 | 9/2015 | Nishida et al. | |

FOREIGN PATENT DOCUMENTS

| | | | | |
|---|---|---|---|---|
| DE | 4423932 A1 * | 1/1996 | | B23Q 3/12 |
| DE | 102014211412 B3 * | 11/2015 | | B23B 31/008 |
| EP | 1291130 | 3/2003 | | |
| EP | 2756918 | 7/2014 | | |
| JP | S62181303 | 11/1987 | | |

OTHER PUBLICATIONS

International Search Report in International Application No. PCT/EP2018/073729, dated Nov. 29, 2018.

* cited by examiner

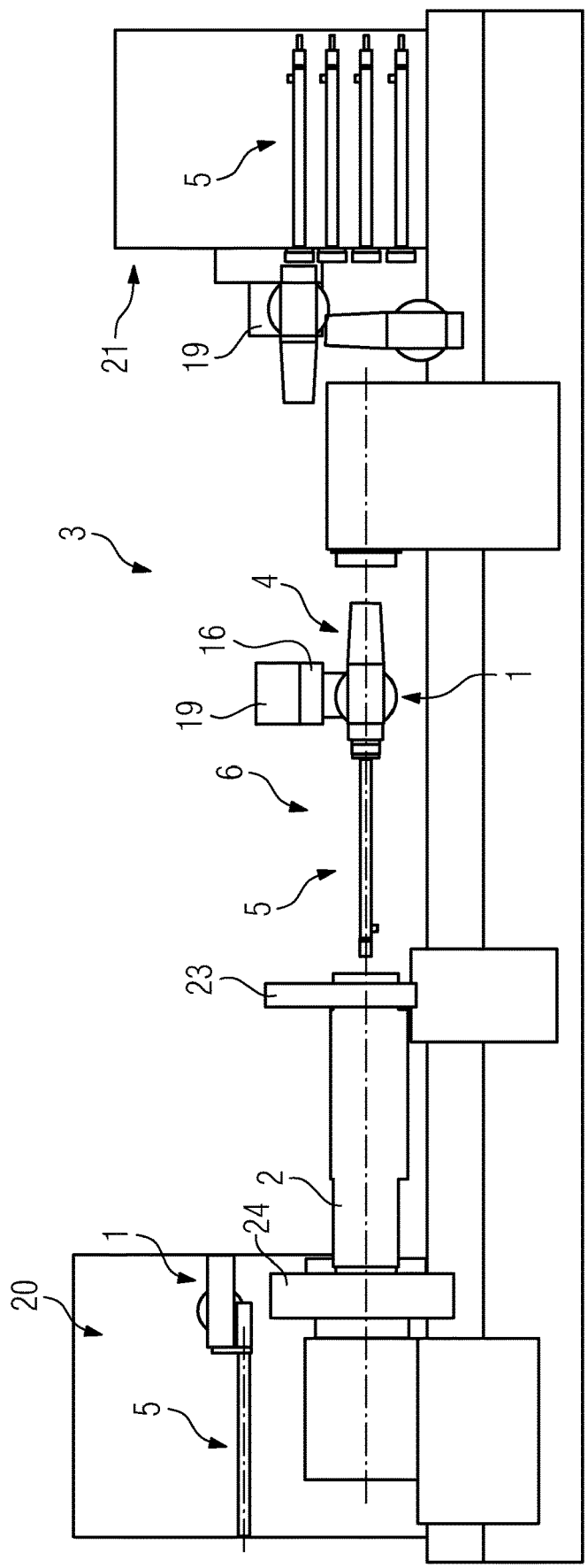

MACHINING HEAD FOR THE MECHANICAL, IN PARTICULAR CUTTING, MACHINING OF A WORKPIECE

The invention relates to a machining head for the mechanical, in particular cutting, machining, in particular for the actuation, of a workpiece.

Corresponding machining heads are known per se from the field of mechanical, i.e. in particular cutting, machining, i.e. for example the milling, of workpieces.

Corresponding machining heads can serve, for example, for hollowing out or boring ("bottle boring," "seat boring") a, typically elongate, workpiece. A specific example of application or use of a corresponding machining head is therefore the hollowing out or boring of a workpiece, in which a typically fully cylindrical workpiece is to be hollowed out or bored, in order to produce a required internal contour, i.e. in particular a bore-like or bore-shaped recess, inside the workpiece.

Corresponding machining heads are typically coupled to a machining tool chosen with regard to the mechanical machining operation to be carried out in each case. It has been conventional hitherto that the coupling of a respective machining tool to a machining head takes place by means of a separate adapter device arranged between them. Therefore, for coupling of a machining tool to a machining head a separate adapter device is necessary in order to enable the coupling of the respective machining tool to the machining head.

Accordingly, the coupling of a machining tool to a machining head is complex, as a separate adapter device needs to be provided for this.

The object of the invention, in particular with regard to a simplified coupling of a machining tool to a machining head, is to specify an improved machining head for mechanical, in particular cutting, machining, in particular for the hollowing out of a workpiece.

This object is achieved by a machining head according to claim 1. The dependent claims relate to possible embodiments of the machining head.

The machining head described here serves generally for the mechanical, in particular cutting, machining of a workpiece. The machining head may in particular serve, for example, for hollowing out or boring a workpiece ("bottle boring," "seat boring"). A specific example of application or use of a corresponding machining head is therefore the hollowing out or boring of a workpiece, in which a typically fully cylindrical workpiece is to be hollowed out or bored, in order to produce a required internal contour, i.e. in particular a bore-like or bore-shaped recess, inside the workpiece; in other words, a typically fully cylindrical workpiece should be provided with a specific internal contour, i.e. typically a bore-like or bore-shaped recess. A corresponding workpiece may in all cases be an elongate workpiece, i.e. for example a cylinder.

As will be seen below, the machining head is typically employed in a machining center for mechanical, i.e. in particular cutting, machining of workpieces.

The machining head comprises a housing structure, designated in short as a housing, which is typically closed at least partially, in particular completely, and on or in which specific functional components of the machining head or of a machining device, formed by coupling the machining head to a machining tool through coupling of the machining head, are arranged or formed. The housing typically comprises a housing interior, in which specific functional components of the machining head or of a corresponding machining device are arranged or designed. The housing may be surrounded at least partially, where applicable completely, by at least one cover element which also determines the external spatial shape of the housing.

In order to couple a machining tool, which may be in particular a hollowing-out tool, to the machining head, i.e. to join them structurally, in order to be able to carry out a mechanical machining operation, the housing comprises a coupling region. Therefore, the coupling region serves for coupling of a machining tool, which is to be coupled to the machining head, to the machining head. The coupling region comprises at least one coupling interface for directly coupling or connecting a machining tool to be coupled to the machining head or to be coupled to the machining head. Therefore, the housing-side coupling interface makes possible a direct coupling of a machining tool to the housing without interposition of a further component or a further component group, i.e. in particular without interposition of an adapter device, so that a machining tool directly coupled to the housing without interposition of a further component or a further component group, i.e. in particular without interposition of an adapter device, can be connected or is connected structurally to the housing-side coupling interface.

The housing-side coupling region is typically designed for (damage-free or non-destructive) releasable coupling of a machining tool designed to be coupled to the machining head; correspondingly, the at least one coupling interface is typically designed for direct releasable coupling of a machining tool to be coupled to the machining head, so that at any time a replacement or change of machining tools, as required, for example, in the event of use of the machining head for different machining operations, is possible.

From the preceding paragraph it can be seen that the at least one coupling interface may be designed for direct coupling of different machining tools to be coupled to the machining head. Therefore, the machining head can be coupled to different machining tools and, therefore, can be used for different machining operations. Different machining tools are understood to be both machining tools having the same machining function and also to those having a different machining function. As an example of different machining tools having the same machining function mention may be made, for example, of differently dimensioned boring or hollowing-out tools as well as facing tools.

An essential feature of the machining head described here is the possibility of direct coupling of a machining tool to the housing or, vice versa, direct coupling of the housing to a machining tool, which, in particular with regard to a simplified coupling of a machining tool to a machining head for the mechanical, results in an improved machining head for mechanical, in particular cutting, machining, in particular for the hollowing out of a workpiece.

The direct coupling between a machining tool and the housing-side coupling interface typically takes place by, in particular, mechanical co-operation of coupling elements on the coupling interface side and coupling elements on the machining tool side. The corresponding coupling elements may be, for example, positive-locking elements, i.e. for example projecting elements formed by projections, or receiving elements formed by recesses, openings, etc., and/or force-fitting elements, i.e. for example screw elements. By the co-operation of respective coupling elements on the coupling interface side and on the machining tool side, a quick coupling can be implemented, so that a machining tool to be coupled to the housing, for example before a machining operation or in the event of changing of a machining tool, can be coupled quickly and simply, in particular automatably or automatically, to the housing, for example after a machining operation or in the event of changing of a machining tool, or a machining tool to be decoupled from the housing can be quickly and simply decoupled, in particular automatably or automatically, from the housing.

The housing-side coupling interface may be designed as a coupling flange and accordingly may be designated or regarded as a coupling flange.

The housing-side coupling interface may comprise at least one force-transmitting element for transmitting a driving force generated by a driving device for driving a machining tool connected directly to the housing. Therefore, the coupling interface can not only facilitate the direct coupling of a machining tool to the housing, but also a transmission of a driving force generated by a driving device—this may also be understood as a driving (force) torque—for driving a machining tool connected directly to the housing. Where appropriate, a corresponding force transmitting element can be formed by a corresponding coupling element on the coupling interface side or vice versa. The possibility of using a coupling element on the coupling interface side likewise as a force transmitting element constitutes an embodiment which is highly integrated in functional and also structural terms and thus is advantageous.

A corresponding driving device, which may be formed, for example, as an electric and/or hydraulic drive, may be arranged or formed (directly) in or on the housing. Therefore, the machining head may comprise a driving device which is (directly) integrated, i.e. arranged or formed in or on the housing, encompass, and which is designed for generating a driving force for driving, in particular rotary driving, of a machining tool, in particular of a hollowing-out tool, coupled directly to the housing. The integration of a driving device into the machining head constitutes an embodiment of the machining head which is highly integrated in functional and also structural terms and thus is advantageous. If no driving device is integrated into the housing the machining head typically comprises, in particular on the housing side, force-transmitting elements, i.e. for example gearbox elements, by means of which a driving force generated by an external driving device can be transmitted by means of the machining head to the machining tool. Obviously, corresponding force-transmitting elements may also be present in a machining head with integrated driving device.

In addition to driving of a machining tool coupled to the machining head, so that the latter can be set, for example, in rotary motion, for specific machining operations, i.e. for example for a hollowing-out operation, an (axial) thrust of the machining tool may be necessary. Accordingly the machining head can comprise an advancing device which is (directly) integrated, i.e. arranged or formed on or in the housing, and is designed for generating a thrust force by which a machining tool connected to the housing is set in a thrust motion along a thrust axis, i.e. for example the machine axis (z-axis) of a machining center equipped with the machining head.

A corresponding advancing device may comprise a driving device, in particular a linear driving device, for example implemented electrically and/or hydraulically, by means of which the thrust force for setting the machining tool coupled to the housing in a thrust motion along the thrust can be generated or is generated. The thrust motion of the machining tool may be a relative motion of the machining tool relative to the housing. Therefore, the machining tool can be coupled to the housing so as to be movable relative to the housing with respect to the reference system of the machining head. In any case a thrust motion may be a forward thrust motion towards the workpiece to be machined or an opposing backward thrust motion.

The machining head may comprise a further housing-side coupling region for, in particular, (damage-free or non-destructive) releasable coupling of the housing to a bearing or supporting device supporting the housing, wherein the further housing-side coupling region comprises at least one further coupling interface for bearing the housing on the bearing device. A structural connection of the housing to a bearing device supporting the housing is possible by means of the further coupling region or the further coupling interface. The bearing device typically constitutes the component of the machining head by means of which it can be connected or coupled to a machining center.

Correspondingly, the bearing device can comprise at least one coupling region on the bearing device side for, in particular, (damage-free or non-destructive) releasable coupling of the bearing device to a bearing portion of a machining center which is arranged or formed in particular on a frame structure on the machining center side as part of a machine mount or frame of the machining center.

The housing can be supported on the bearing device so as to be movable in at least one degree of freedom of movement. The degree of freedom of movement may be a degree of freedom of rotational or pivoting movement about a rotation or pivot axis. The rotation or pivot axis is typically a horizontal axis (y-axis) oriented transversely to the machine axis (z-axis) on the machining center side.

Accordingly, the housing can be supported so as to be pivotable relative to a spatial axis serving as reference axis, i.e. for example the machine axis (z-axis) on the machining center side, so that different machining axes or positions can be produced by corresponding pivoting movements of the housing. A pivotable support can enable pivoting of the housing clockwise and/or anticlockwise about a specific angular range, for example of up to 360°. Therefore, a machining tool coupled to the housing can be oriented gradually or in specific stages by corresponding pivoting movements of the housing in different spatial axes or directions, which may be necessary or expedient for specific machining operations, for instance for the formation of bore-like or bore-shaped recesses extending obliquely with respect to a horizontal axis in a workpiece. Movements, i.e. in particular pivoting movements of the housing relative to the bearing device can be implemented by a suitable, for example motor-powered, driving device, i.e. in particular a pivot driving device. A corresponding driving device can be arranged or formed on the bearing device side or on the housing side.

It applies to all embodiments that suitable, for example conduit-like, supply elements, through which a process fluid, i.e. for example a cooling and/or flushing fluid, or compressed air, etc., can flow, can be arranged or formed in or on the machining head.

The invention relates to the machining head and also to a machining device for the mechanical, in particular cutting, machining, in particular for the actuation, of a workpiece. The machining device comprises a machining head as described and a machining tool coupled directly to the housing of the machining head. The machining tool may be in particular a hollowing-out tool. All the statements in connection with the machining head apply analogously to the machining device.

The invention further relates to a machining head for the mechanical, in particular cutting, machining, in particular for the actuation, of a workpiece. The machining center designed, for example, as a milling center comprises at least one machining head as described or at least one corresponding machining device. All the statements in connection with the machining head apply analogously to the machining center.

The at least one machining head can, as already mentioned above, be supported on a bearing portion which is arranged or formed in particular on a frame structure on the machining center side as part of a machine mount or frame of the machining center. The bearing portion on the machining center side typically co-operates with a bearing device on the machining head side, as described above in connection with the machining head. As mentioned, the bearing device on the machining head side typically constitutes the component of the machining head by means of which it is or can be connected to a machining center.

In principle, the machining center can be operated with different machining heads. In order to create an integrated receiving or storage facility for machining heads which are not in operation, the machining center can comprise at least one store-like or magazine-like receiving area or compartment for (temporarily) receiving or storing at least one machining head which is not in operation. Therefore, machining heads which are not in operation can be received or stored in the receiving area, which may also be designated or regarded as a receiving station for machining heads. The receiving area can be integrated in a part of the machine mount or frame of the machining center, i.e. arranged or formed therein or thereon.

The receiving area may comprise separate receiving sections for receiving at least one machining head in each case. Respective receiving sections can be arranged like shelves for example in rows and/or columns or like drums. Respective receiving sections can be provided with sensor devices, i.e. for example weight sensors, optical sensors, etc., in order for example to determine whether a machining head is located in a receiving section or which machining head is located in which receiving section. Corresponding information is contained in data form in the sensor information generated by corresponding sensor arrangements. Sensor information generated by corresponding sensor arrangements can, therefore, give a user a comprehensive picture of the current and possibly also the future occupancy of the receiving area with machining heads. In principle, of course, corresponding sensor information can be transmitted by means of suitable data transmission devices or connections to any communication partner, i.e. for example a manufacturing or control center.

As mentioned, a machining head can be operated with different machining tools by coupling and decoupling of different machining tools to or from the housing. In order to create an integrated receiving or storage facility for machining tools which are not in operation, the machining center can comprise at least one (optionally further) store-like or magazine-like receiving area or compartment for (temporarily) receiving or storing at least one machining tool which is not in operation. Therefore, machining tools which are not in operation can be received or stored in the receiving area, which may also be designated or regarded as a receiving station for machining tools. The receiving area can be integrated into a part of the machine mount or frame of the machining center, i.e. arranged or formed therein or thereon.

The receiving area can likewise comprise separate receiving sections for receiving at least one machining tool in each case. Respective receiving sections can likewise be arranged like shelves, for example in rows and/or columns or like drums. Respective receiving sections can likewise be provided with sensor devices, i.e. for example weight sensors, optical sensors, etc., in order for example to determine whether a machining tool is located in a receiving section or which machining tool is located in which receiving section. Corresponding information is contained in data form in the sensor information generated by corresponding sensor arrangements. Sensor information generated by corresponding sensor arrangements can, therefore, can give a user a comprehensive picture of the current and possibly also the future occupancy of the receiving area with machining tools. In principle, of course, corresponding sensor information can be transmitted by means of suitable data transmission devices or connections to any communication partner, i.e. for example a manufacturing or control center.

If the machining center comprises both a receiving area for machining heads and also a receiving area for machining tools, these can be arranged or formed opposite one another. Accordingly, respective receiving areas for machining heads and machining tools can be arranged or formed opposite one another, in particular in the region of respective (free) ends of the typically elongate machining center arranged opposite one another. Of course, a receiving area ("combined receiving area") to receive both machining heads and also machining tools is also possible.

It has been mentioned that the at least one machining head can be supported on a bearing portion which is arranged or formed in particular on a frame structure on the machining center side as part of a machine mount or frame of the machining center. The bearing portion, where appropriate together with a machining head supported thereon (with or without a machining tool coupled thereto), can be supported movably relative to the frame structure on the machining center side in at least one degree of freedom of movement defining a movement path. The movable support of the bearing portion is advantageous in particular with regard to the performance of different machining operations as well as, as shown below, the replacement or change of machining heads or tools. A corresponding degree of freedom of movement can be, in principle, a translational and/or rotational degree of freedom of movement; accordingly, a movement path can be a translational and/or rotational movement path. Of course, combined movements in different degrees of freedom of movement or movement paths are possible.

A respective receiving area may be closed by a closing portion which can be moved into a closed position, which, in particular during operation of the machining center, prevents undesirable contamination of each of the received machining heads or tools.

Examples of specific movements of the bearing portion, where appropriate together with a machining head supported thereon (with or without a machining tool coupled thereto), in or between specific positions, which are advantageous in particular with regard to a replacement or change of machining heads or tools, are mentioned below:

The bearing portion, where appropriate together with a machining head supported thereon (with or without a machining tool coupled thereto), can be supported movably or can be moved in at least one degree of freedom of movement defining a movement path between an operating position and a transfer position. In the operating position a machining head supported on the bearing portion can be put into operation for mechanical machining of a workpiece to be mechanically machined by means of the machining center.

In a (first) transfer position a machining tool, which is coupled to a machining head supported on the bearing portion, can be transferred into an or the store-like or magazine-like receiving area on the machining center side for receiving at least one machining tool, which is not in operation, for decoupling from a machining head or a machining tool received in a corresponding receiving area can be transferred to a machining head for coupling to the machining head. Therefore, in the first transfer position the bearing portion is moved or positioned relative to a receiving area for receiving machining tools in such a way that a transfer of machining tools into the receiving area or out of the receiving area is possible.

In a further or second transfer position opposite the first transfer position, for example, a machining head supported on the bearing portion can be transferred into a or the store-like or magazine-like receiving area on the machining center side for receiving at least one machining head, which is not in operation, for decoupling from the bearing portion, or a machining head received in a corresponding receiving area can be transferred to a machining head for coupling to the machining head. Therefore, in the second transfer position the bearing portion is moved or positioned relative to a receiving area for receiving machining heads in such a way that a transfer of machining heads into the receiving area or out of the receiving area is possible.

Respective first and second transfer positions can be located in particular in a common plane, above the machining axis or machine axis.

Of course, the first and the second transfer position can coincide if a receiving area for receiving both machining tools and also machining heads is present.

The manipulation of respective machining heads or tools may be performed by at least one manipulating device. The manipulating device is advantageously configured for realizing an automatable or automated manipulation of respective machining heads or tools, in particular in connection with the transfer of machining heads or tools in/out of a corresponding receiving area, or the coupling of machining tools to machining heads. A corresponding manipulating device may be designed as a gripper device comprising at least one gripper element or may comprise at least one such gripper device. A gripper device may be designed, for example, as a (multi-axis) gripping robot.

Accordingly, the machining center may comprise at least one manipulating device, which is configured for, in particular, automatable or automated manipulation of a machining tool in connection with the transfer of a machining tool from or into a corresponding store-like or magazine-like receiving area on the machining center side to a machining head for coupling or decoupling of the machining tool to or from the machining head. Alternatively or in addition, the machining center may comprise a manipulating device, which is configured for, in particular, automatable or automated manipulation of a machining head in connection with the transfer of a machining head from or into a corresponding store-like or magazine-like receiving area on the machining center side to a storage portion for coupling or decoupling of the machining head to or from the bearing portion.

Movements of the bearing portion, in particular between respective operating and transfer positions, and of the manipulating device or of the manipulating elements belonging to the manipulating device are typically carried out by hardware and/or software implemented by a control device on the machining center side (not shown). Therefore, the control device is designed to generate control information to control movements of the bearing portion, in particular between respective operating and transfer positions, and of the manipulating elements belonging to the manipulating device.

Figure 2:
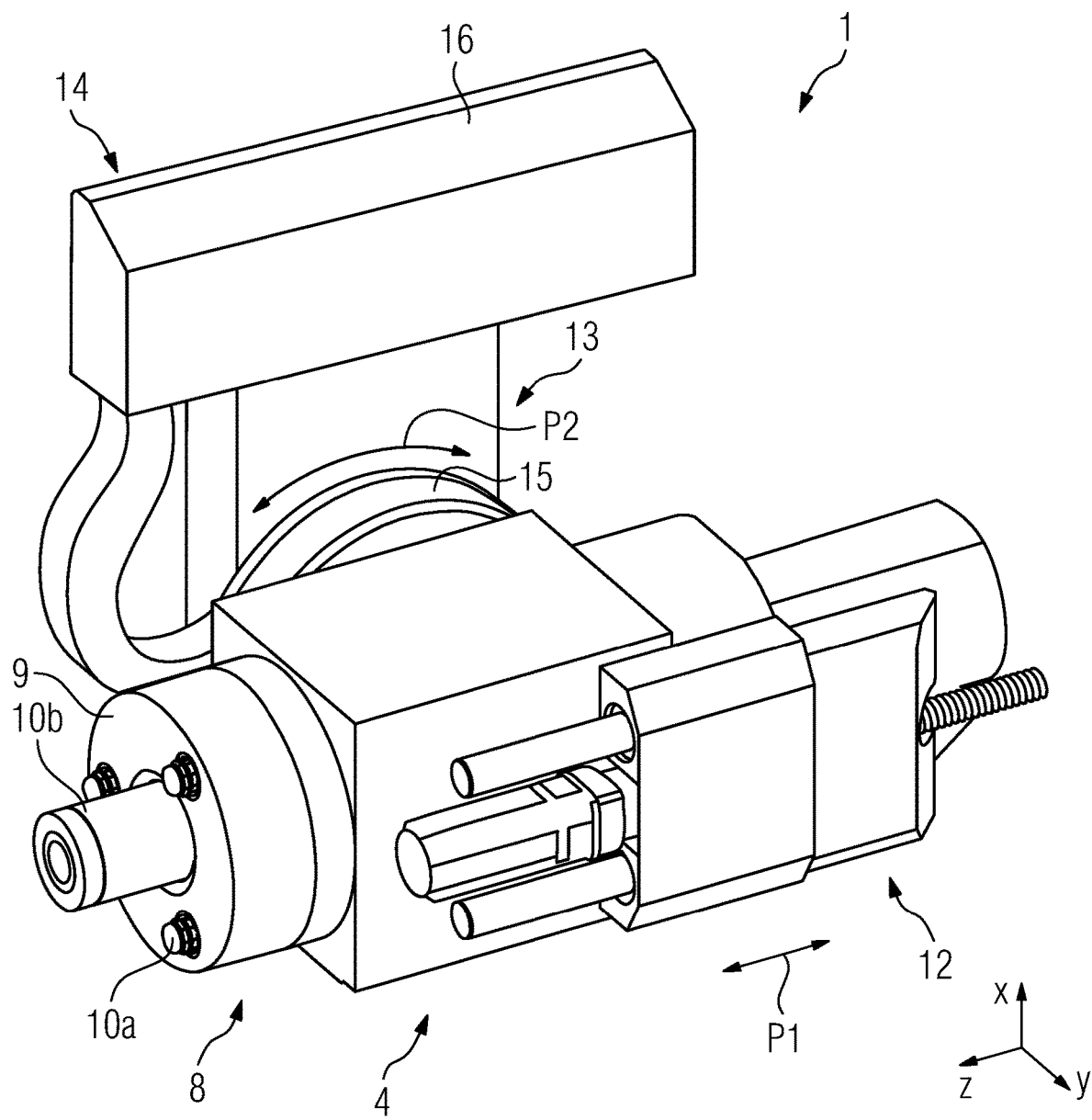
Figure 3:
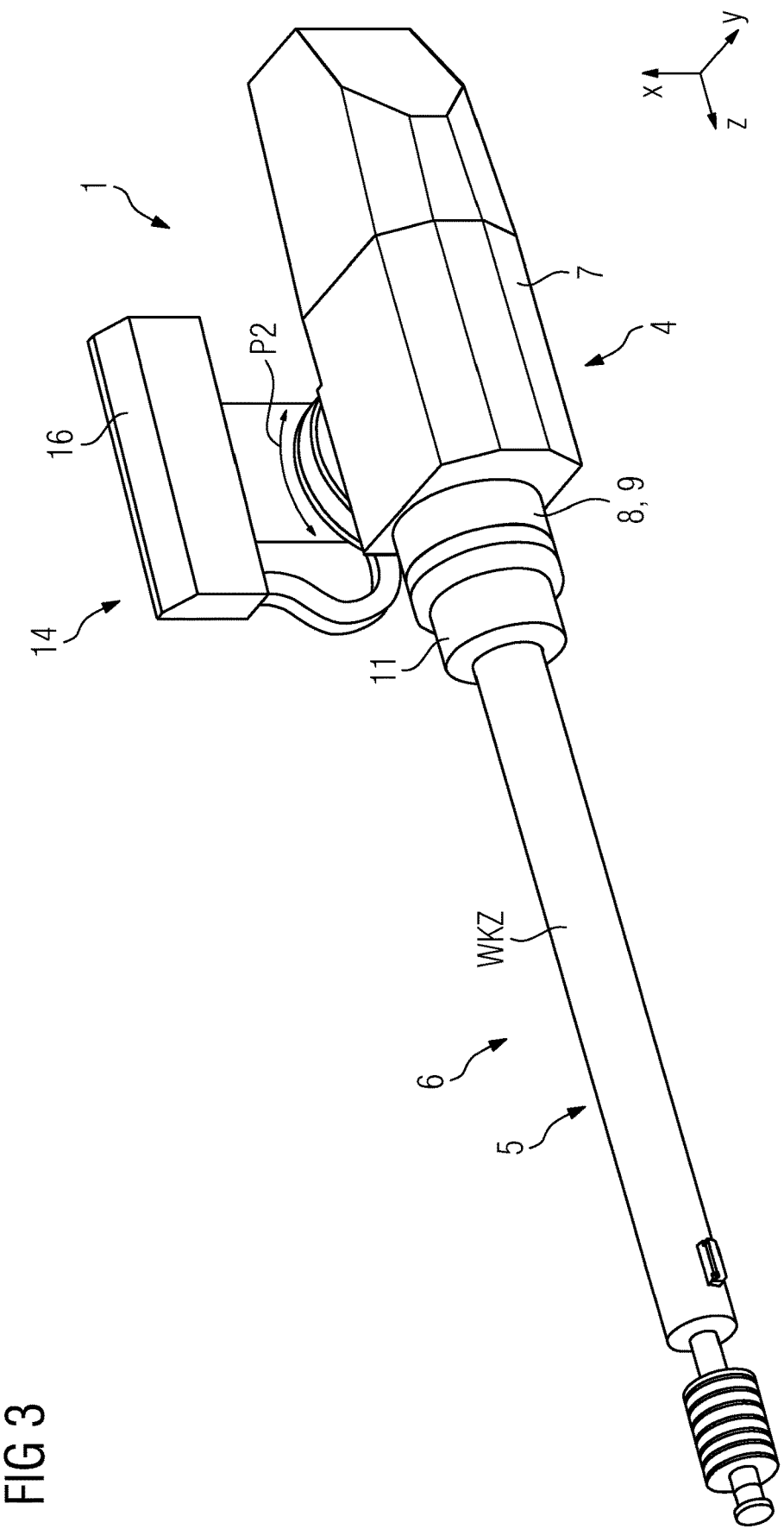
Figure 4:
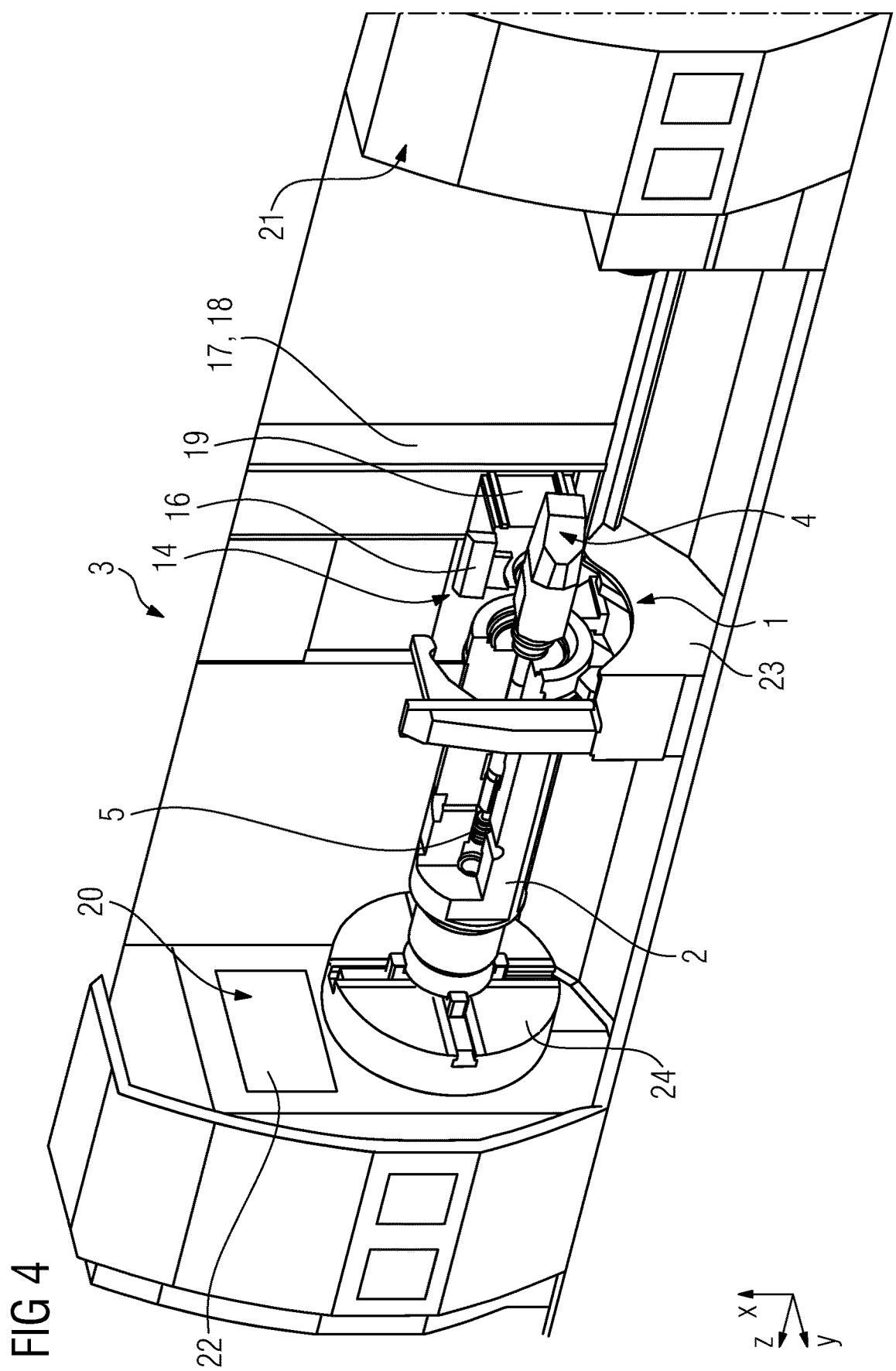

The invention is explained with reference to an exemplary embodiment shown in the drawings. In the drawings:

FIGS. 1, 2 each show a schematic illustration of a machining head according to one exemplary embodiment;

FIG. 3 shows a schematic illustration of a machining device according to one exemplary embodiment; and FIGS. 4, 5 each show a schematic illustration of a machining center according to one exemplary embodiment.

FIGS. 1, 2 each show a schematic illustration of a machining head 1 according to one exemplary embodiment. The machining head 1 is illustrated in FIGS. 1, 2 in each case in a perspective view.

The machining head 1 serves in general for the mechanical, i.e. in particular cutting, machining of a workpiece 2 (cf. FIG. 4). In particular, the machining head 1 serves, for example, for hollowing out a workpiece 2 by bottle boring or seat boring. Therefore, a specific example of application or use of the machining head 1 is the bottle boring or seat boring of a workpiece 2. The workpiece 2 may in all cases be an elongate workpiece 2, i.e. for example a cylinder, etc.

As is described below in connection with the description of FIGS. 4, 5, the machining head 1 is typically employed in a machining center 3 for mechanical, i.e. in particular cutting, machining of workpieces 2.

The machining head 1 comprises a housing structure, designated in short as a housing 4, on or in which specific functional components of the machining head 1 or of a machining device 6 (cf. FIG. 3) formed by coupling the machining head 1 to a machining tool 5 are arranged or formed. The housing 4 typically comprises a housing interior (not shown), in which specific functional components of the machining head 1 or of a corresponding machining device 6 are arranged or formed. As can be seen from a comparison of FIGS. 1, 2, in which the housing 4 is illustrated in FIG. 2 without a cover element 7, the housing 4 can be surrounded at least partially by at least one cover element 7.

In order to couple a machining tool 5, which may be a hollowing-out tool in the embodiments shown in the drawings, to the machining head 1, i.e. to join them structurally, in order to be able to carry out a mechanical machining operation, the housing 4 comprises a coupling region 8. Therefore, the coupling region 8 serves for coupling of a machining tool 5 which is to be coupled to the machining head 1. The coupling region 8 comprises at least one coupling interface 9 for directly coupling or connecting a machining tool 5 to be coupled to the machining head 1 or to be connected to the machining head 1. The coupling interface 9 formed as a coupling flange and accordingly to be designated or regarded as a coupling flange enables a direct coupling of a machining tool 5 to the housing 4 without interposition of a further component or of a further component group, i.e. in particular without interposition of an adapter device.

The coupling interface 9 is designed for direct releasable coupling of a machining tool 5 to be coupled to the machining head 1, so that at any time a replacement or change of machining tools 5, as required, for example, in the event of use of the machining head 1 for different machining operations, is possible.

The coupling interface 9 may be designed for direct coupling of different machining tools 5 to be coupled to the machining head 1. Therefore, the machining head 1 can be coupled to different machining tools 5 and, therefore, can be used for different machining operations. Different machining tools 5 are understood to be both machining tools 5 having the same machining function and also to those having a different machining function.

The direct coupling between a machining tool 5 and the coupling interface 9 takes place by, in particular, mechanical co-operation of coupling elements 10a, 10b on the coupling interface side and coupling elements 11 on the machining tool side. As can be seen from FIGS. 1, 2, the corresponding coupling elements 10a, 10b, 11 may be, for example, positive-locking elements, i.e. for example projecting elements formed by projections, or receiving elements formed by recesses, openings, etc. By the co-operation of respective coupling elements 10a, 10b, 11 on the coupling interface side and on the machining tool side, a force-transmitting quick coupling can be implemented, so that a machining tool 5 to be coupled to the housing 4, for example before a machining operation or in the event of changing of a machining tool 5, can be coupled quickly and simply, in particular automatably or automatically, to the housing 4, for example after a machining operation or in the event of changing of a machining tool 5, or a machining tool 5 to be decoupled from the housing 4 can be quickly and simply decoupled, in particular automatably or automatically, from the housing 4.

Moreover, the housing-side coupling interface 9 may comprise at least one force-transmitting element for transmitting a driving force generated by a driving device (not shown) for driving a machining tool 5 connected directly to the housing 4. Therefore, the coupling interface 9 may not only facilitate the direct coupling of the machining tool to the housing 4, but also a transmission of a driving force generated by a driving device—this may also be understood as a driving (force) torque—for driving a machining tool 5 connected directly to the housing 4. In the exemplary embodiments shown in the drawings, a corresponding force transmitting element is formed by a corresponding coupling element 10a, 10b on the coupling interface side.

A corresponding driving device, which may be formed, for example, as an electric and/or hydraulic drive, may be arranged or formed (directly) in or on the housing 4. Therefore, the machining head 1 may comprise a driving device which is (directly) integrated, i.e. arranged or formed in or on the housing 4, and which is designed for generating a driving force for driving, in particular rotary driving, of a machining tool 5 coupled directly to the housing 4. If no driving device is integrated into the housing 4 the machining head 1 typically comprises, in particular on the housing side, force-transmitting elements, i.e. for example gearbox elements, by means of which a driving force generated by an external driving device can be transmitted by means of the machining head 1 to the machining tool 5. Obviously, corresponding force-transmitting elements may also be present in a machining head 1 with integrated driving device.

In addition to driving of a machining tool 1 coupled to the machining head 1, so that the latter can be set, for example, in rotary motion, for specific machining operations, i.e. for example for a hollowing-out operation, an (axial) thrust of the machining tool 5 may be necessary. Accordingly the machining head 1 comprises an advancing device 12 which is (directly) integrated, i.e. arranged or formed on or in the housing 4, and is designed for generating a thrust force by which a machining tool 5 connected to the housing 4 is set in a thrust motion (forward or backward thrust motion) along a thrust axis indicated by the double arrow P1, i.e. for example the machine axis (z-axis) of a machining center 3 equipped with the machining head 1. The advancing device 12 may comprise a driving device (not designated in greater detail), in particular a linear driving device, for example implemented electrically and/or hydraulically, by means of which the thrust force for setting the machining tool 5 coupled to the housing 4 in a thrust motion along the thrust can be generated or is generated. The thrust motion of the machining tool 5 is a relative motion of the machining tool 5 relative to the housing 4.

The machining head 1 comprises a further housing-side coupling region 13 for releasable coupling of the housing 4 to a bearing device 14 supporting the housing 4, wherein the further housing-side coupling region 13 comprises at least one further coupling interface 15 for bearing the housing 4 on the bearing device 14. A structural connection of the housing 4 to the bearing device 14 supporting the housing 4 is possible by means of the further coupling region 13 or the further coupling interface 15. The bearing device 14 constitutes the component of the machining head 1 by means of which it can be connected or coupled to a machining center 3.

Correspondingly, the bearing device 14 can comprise at least one coupling region 16 on the bearing device side for releasable coupling of the bearing device 14 to a bearing portion 19 of a machining center 3 which is arranged or formed in particular on a frame structure 17 on the machining center side as part of a machine mount or frame 18 of the machining center 3.

The housing 4 can be supported on the bearing device 14 so as to be movable in at least one degree of freedom of movement. The degree of freedom of movement may be a degree of freedom of rotational or pivoting movement about a rotation or pivot axis A1. FIG. 1 shows that the rotation or pivot axis A1 is a horizontal axis (y-axis) oriented transversely to the machine axis (z-axis) on the machining center side.

Accordingly, the housing 4 is supported so as to be pivotable relative to a spatial axis serving as reference axis, i.e. for example the machine axis (z-axis) on the machining center side, so that different machining axes or positions can be produced by corresponding pivoting movements of the housing 4. As indicated by the double arrow P2, a pivotable support can enable pivoting of the housing 4 clockwise and/or anticlockwise about a specific angular range. Therefore the machining tool 5 coupled to the housing 4 can be oriented gradually or in specific stages by corresponding pivoting movements of the housing 4 in different spatial axes or directions, which may be necessary or expedient for specific machining operations, for instance for the formation of bore-like or bore-shaped recesses extending obliquely with respect to a horizontal axis in a workpiece 2. Pivoting movements of the housing 4 relative to the bearing device 14 are implemented by a suitable, for example motor-powered, driving device (not shown), i.e. in particular a pivot driving device. The driving device can be arranged or formed on the bearing device side or on the housing side.

Although not identified in the drawings, suitable, for example conduit-like, supply elements, through which a process fluid, i.e. for example a cooling and/or flushing fluid, or compressed air can flow, can be arranged or formed in or on the machining head 1.

FIGS. 4, 5 each show a schematic illustration of a machining center 3 for the mechanical, in particular cutting, machining, in particular for the hollowing out, of a workpiece 2. The machining center 3 is illustrated in FIG. 4 in a perspective view and in FIG. 5 in a side view. The machining center 3 comprises at least one machining head 1 or at least one machining device 6.

The machining head 1 can be seen which is supported on a bearing portion 19 arranged or formed on a frame structure 17 on the machining center side as part of the machine frame 18 of the machining center 3. The bearing portion 19 on the machining center side interacts with the bearing device 14 on the machining head side which, as mentioned, constitutes the component of the machining head 1 by means of which it can be connected or coupled to a machining center 3.

In principle, the machining center 3 can be operated with different machining heads 1. In order to create an integrated receiving or storage facility for machining heads 1 which are not in operation, the machining center 3 comprises a store-like or magazine-like receiving area or compartment 20 for (temporarily) receiving or storing at least one machining head 1 which is not in operation. Therefore, machining heads 1 which are not in operation can be received or stored in the receiving area 20, which may also be designated or regarded as a receiving station for machining heads 1. The receiving area 20 is integrated in a part of the machine frame 18 of the machining center 3, i.e. arranged or formed therein or thereon.

The receiving area 20 may comprise separate receiving sections (not shown) for receiving at least one machining head 1 in each case. Respective receiving sections can be arranged like shelves in rows and/or columns or like drums and provided with sensor devices (not shown), i.e. for example weight sensors, optical sensors, etc., in order for example to determine whether a machining head 1 is located in a receiving section or which machining head 1 is located in which receiving section. Corresponding information is contained in data form in the sensor information generated by corresponding sensor arrangements. Sensor information generated by corresponding sensor arrangements can, therefore, can give a user a comprehensive picture of the current and possibly also the future occupancy of the receiving area 20 with machining heads 1. In principle, corresponding sensor information can be transmitted by means of suitable data transmission devices (not shown) or connections to any communication partner, i.e. for example a manufacturing or control center.

As mentioned, a machining head 1 can be operated with different machining tools 5 by coupling and decoupling of different machining tools 5 to or from the housing 4. In order to create an integrated receiving or storage facility for machining tools 5 which are not in operation, the machining center 3 comprises a further store-like or magazine-like receiving area or compartment 21 for (temporarily) receiving or storing at least one machining head 5 which is not in operation. Therefore, machining tools 5 which are not in operation can be received or stored in the further receiving area 21, which may also be designated or regarded as a receiving station for machining tools 5. The receiving area 21 is also integrated into a part of the machine frame 18 of the machining center 3, i.e. arranged or formed therein or thereon.

The receiving area 21 can likewise comprise separate receiving sections (not shown) for receiving at least one machining tool 5 in each case. Respective receiving sections can likewise be arranged like shelves in rows and/or columns or like drums. Respective receiving sections can likewise be provided with sensor devices, i.e. for example weight sensors, optical sensors, etc., in order for example to determine whether a machining tool 5 is located in a receiving section or which machining tool 5 is located in which receiving section. Corresponding information is contained in data form in the sensor information generated by corresponding sensor arrangements. Sensor information generated by corresponding sensor arrangements can, therefore, give a user a comprehensive picture of the current and possibly also the future occupancy of the receiving area 21 with machining tools 5. In principle, corresponding sensor information can be transmitted by means of suitable data transmission devices or connections to any communication partner, i.e. for example a manufacturing or control center.

In the exemplary embodiment illustrated in FIGS. 4, 5 the receiving area 20 for machining heads 1 and the receiving area 21 for machining tools 5 are arranged in the region of respective (free) ends of the machining center 3 arranged opposite one another, for example horizontally opposite one another. In principle, of course, a combined receiving area to receive both machining heads 1 and also machining tools 5 is also possible.

A respective receiving area 20, 21 may be closed by a closing portion 22 (cf. FIG. 4, left) which can be moved into a closed position, which, in particular during operation of the machining center 3, prevents undesirable contamination of each of the received machining heads 1 or tools 5.

It has been mentioned that the machining head 1 is supported on a bearing portion 19 arranged or formed on a frame structure 17 on the machining center side as part of the machine frame 18 of the machining center 3. The bearing portion 19, where appropriate together with the machining head 1 supported thereon (with or without a machining tool coupled thereto), can be supported movably relative to the frame structure 17 on the machining center side in at least one degree of freedom of movement defining a movement path. The movable support of the bearing portion 19 is advantageous with regard to the performance of different machining operations as well as, as shown below, the replacement or change of machining heads 1 or tools 5.

Examples of movements of the bearing portion 19, where appropriate together with a machining head 1 supported thereon (with or without a machining tool 5 coupled thereto), in or between specific positions, which are advantageous in particular with regard to a replacement or change of machining heads 1 or tools 5, are described below:

The bearing portion 19, where appropriate together with a machining head 1 supported thereon (with or without a machining tool 5 coupled thereto), can be supported movably or can be moved in at least one degree of freedom of movement defining a movement path between an operating position shown in FIG. 4 or in FIG. 5 (center) and a transfer position shown in FIG. 5 (right). In the operating position the machining head 1 supported on the bearing portion 19 can be put into operation for mechanical machining of a workpiece 2 to be mechanically machined by means of the machining center.

In a first transfer position, cf. FIG. 5, right, a machining tool 5, which is coupled to a machining head 1 supported on the bearing portion 19, can be transferred into the store-like or magazine-like receiving area 21 for decoupling from the machining head 1 or a machining tool 1 received in the receiving area 21 can be transferred to a machining head 1 for coupling to the machining head 1. Therefore, in the first transfer position the bearing portion 19 is moved or positioned relative to the receiving area 21 in such a way that a transfer of machining tools into the receiving area or out of the receiving area is possible.

In a further or second transfer position opposite the first transfer position, a machining head 1 supported on the bearing portion 19 can be transferred into the store-like or magazine-like receiving area 21 for receiving at least one machining head 1, which is not in operation, for decoupling from the bearing portion 19 or a machining head 1 received in the receiving area 21 can be transferred for coupling to the bearing portion 19. Therefore, in the second transfer position the bearing portion 19 is moved or positioned relative to the receiving area 21 for receiving machining heads 1 in such a way that a transfer of machining heads 1 into the receiving area 21 or out of the receiving area 21 is possible.

In the exemplary embodiment illustrated in FIGS. 4, 5 respective first and second transfer positions are located in particular in a common plane, above the machining axis or machine axis.

The manipulation of respective machining heads 1 or tools 5 may be performed by a manipulating device (not shown). The manipulating device is configured for realizing an automatable or automated manipulation of respective machining heads 1 or tools 5 in connection with the transfer of machining heads 1 or tools 5 in/out of a corresponding receiving area 20, 21, or the coupling of machining tools 5 to machining heads 1. The manipulating device may be designed as a gripper device comprising at least one gripper element or may comprise at least one such gripper device. A gripper device may be designed, for example, as a (multi-axis) gripping robot.

Movements of the bearing portion 19, in particular between respective operating and transfer positions, and of the manipulating device or of the manipulating elements belonging to the manipulating device are typically carried out by hardware and/or software implemented by a control device on the machining center side (not shown). Therefore, the control device is designed to generate control information to control movements of the bearing portion 19, in particular between respective operating and transfer positions, and of the manipulating elements belonging to the manipulating device.

In all cases, movement paths of the bearing portion 19 typically comprise movement components in the z-direction and x-direction.

Lastly, in connection with FIGS. 4, 5 it should be noted that the workpiece 2 to be machined is supported by means of suitable supporting devices 23, 24 (tailstock, steady rest) in a machining position.

The invention claimed is:

1. A machining head for the mechanical machining of a workpiece by bottle boring, the machining head comprising:
 a housing;
 a machining tool;
 a housing-side coupling region for coupling the machining tool to be coupled to the machining head, wherein the housing-side coupling region comprises at least one coupling interface for directly coupling the machining tool to be coupled to the machining head, wherein
 the direct coupling between the machining tool and the housing-side coupling interface is formed by a mechanical co-operation of coupling elements on the coupling interface side and corresponding coupling elements on the machining tool side, and
 the corresponding coupling elements are positive-locking elements comprising at least one projecting element and at least one receiving element,
 wherein the machining head comprises a further coupling region for releasable coupling of the housing to a bearing device supporting the housing, wherein the housing is pivotably supported on the bearing device about a pivot axis.

2. The machining head according to claim 1, wherein the coupling interface comprises at least one force-transmitter for transmitting a driving force generated by a driving device for driving a machining tool coupled directly to the housing.

3. The machining head according to claim 1, wherein a driving device, which is arranged or formed in or on the housing and which is designed for generating a driving force for driving of a machining tool coupled directly to the housing.

4. The machining head according to claim 3, wherein the driving device is a motor-powered driving device.

5. The machining head according to claim 3, wherein the driving force is for rotary driving.

6. A machining head according to claim 1, wherein an advancing device which is arranged or formed on or in the housing, and is designed for generating a thrust force by which a machining tool connected to the housing is set in a thrust motion along a thrust axis.

7. The machining head according to claim 1, wherein the at least one coupling interface is designed for direct releasable coupling of a machining tool to be coupled to the machining head.

8. The machining head according to claim 1, wherein the at least one coupling interface is designed for direct coupling of a different machining tools to be coupled to the machining head.

9. The machining head according to claim 1, wherein the bearing device comprises at least one coupling region on the bearing device side for releasable coupling of the bearing device to a bearing portion of a machining center which is arranged or formed on a frame structure on the machining center side.

10. The machining device for the mechanical machining of a workpiece, comprising:
 the machining head according to claim 1,
 the machining tool coupled directly to the housing of the machining head.

11. A machining device according to claim 10, wherein the machining tool which is to be coupled or is coupled directly to the housing is a hollowing-out tool.

12. A machining center for the mechanical machining of a workpiece, comprising at least one machining head according to claim 1 and/or at least one machining device comprising:
 the machining head according to claim 1,
 the machining tool coupled directly to the housing of the machining head.

13. The machining center according to claim 12, wherein the machining center comprises a store-like or magazine-like receiving area for receiving at least one machining tool which is not in operation and/or a store-like or magazine-like receiving area for receiving at least one machining head which is not in operation.

14. The machining center according to claim 12, wherein the at least one machining head can be supported on a bearing portion which is arranged or formed on a frame structure on a machining center side.

15. The machining center according to claim 14, wherein the bearing portion, where appropriate together with the machining head supported thereon, can be supported movably relative to a frame structure on the machining center side in at least one degree of freedom of movement defining a movement path.

16. The machining center according to claim 15, wherein the bearing portion, where appropriate together with the machining head supported thereon, is in at least one degree of freedom of movement defining a movement path between an operating position in which a machining head, which is supported on the bearing portion for mechanical machining of a workpiece to be mechanically machined by the machining center, can be put into operation, and a transfer position in which a machining tool, which is coupled to a machining head supported on the bearing portion, can be transferred into a or the store-like or magazine-like receiving area on the machining center side for receiving at least one machining tool, which is not in operation, for decoupling from the machining head, or a machining tool received in a corresponding receiving area can be transferred to a machining head for coupling to the machining head, and/or a further transfer position in which a machining head supported on the bearing portion can be transferred into a or the store-like or magazine-like receiving area on the machining center side for receiving at least one machining head, which is not in operation, for decoupling from the bearing portion, or a machining head received in a corresponding receiving area can be transferred for coupling to the bearing portion.

17. The machining center according to claim 12, wherein a manipulating device, which is configured for automatable or automated manipulation of a machining tool in connection with the transfer of a machining tool from or into a corresponding store-like or magazine-like receiving area on the machining center side to a machining head for coupling or decoupling of the machining tool to or from the machining head, and/or a manipulating device, which is configured for automatable or automated manipulation of a machining head in connection with the transfer of a machining head from or into a corresponding store-like or magazine-like receiving area on the machining center side to a storage portion for coupling or decoupling of the machining head to or from the bearing portion.

18. The machining head according to claim 1, wherein the mechanical machining is a cutting.

* * * * *